(12) United States Patent
Nakamura et al.

(10) Patent No.: US 12,366,474 B1
(45) Date of Patent: Jul. 22, 2025

(54) THERMAL TYPE FLOWMETER

(71) Applicant: TOFLO CORPORATION, Tokyo (JP)

(72) Inventors: Junichi Nakamura, Tokyo (JP);
Ryuichiro Tabata, Tokyo (JP); Akinori Igawa, Tokyo (JP)

(73) Assignee: TOFLO CORPORATION, Tokyo (JP)

( * ) Notice: Subject to any disclaimer, the term of this patent is extended or adjusted under 35 U.S.C. 154(b) by 0 days.

(21) Appl. No.: 18/786,163

(22) Filed: Jul. 26, 2024

(30) Foreign Application Priority Data

Mar. 19, 2024 (JP) ................... 2024-043177

(51) Int. Cl.
*G01F 1/69* (2006.01)
*G01F 1/698* (2006.01)

(52) U.S. Cl.
CPC .............. *G01F 1/6986* (2013.01); *G01F 1/69* (2013.01)

(58) Field of Classification Search
CPC .................................. G01F 1/6986; G01F 1/69
See application file for complete search history.

(56) References Cited

U.S. PATENT DOCUMENTS

| | | | | |
|---|---|---|---|---|
| 3,898,638 A * | 8/1975 | Deane | ..................... | G01F 1/698 374/E13.006 |
| 6,662,121 B1 * | 12/2003 | Oda | ....................... | G01F 1/692 374/30 |
| 10,551,234 B2 * | 2/2020 | Muramatsu | .............. | G01F 15/14 |
| 10,823,750 B2 * | 11/2020 | Kitamura | ................... | G01P 5/12 |
| 10,845,226 B2 * | 11/2020 | Han | ......................... | G01F 1/688 |
| 11,243,223 B2 * | 2/2022 | Kitamura | ................... | G01P 5/12 |
| 2007/0116083 A1 * | 5/2007 | Oda | ....................... | G01F 15/022 374/29 |
| 2016/0011028 A1 | 1/2016 | Skarping et al. | | |
| 2018/0266863 A1 * | 9/2018 | Muramatsu | ............. | G01F 25/10 |
| 2018/0306618 A1 | 10/2018 | Han | | |

FOREIGN PATENT DOCUMENTS

| | | |
|---|---|---|
| CN | 1392393 A | 1/2003 |
| CN | 1677065 A | 10/2005 |
| CN | 103105506 A | 5/2013 |
| CN | 110646017 A | 1/2020 |
| CN | 213120678 U | 5/2021 |
| CN | 113518899 A | 10/2021 |

(Continued)

*Primary Examiner* — Freddie Kirkland, III
(74) *Attorney, Agent, or Firm* — Bridgeway IP Law Group, PLLC; Sang Ho Lee; Hyun Woo Shin (57) ABSTRACT

A thermal type flowmeter that can accurately perform flow rate determination at high speed and high precision even at low flow rate includes a sensor portion conducting heating and temperature detection of a fluid contact portion in contact with a fluid flowing in a flow path, and a control portion controlling heating and temperature detection conducted by the sensor portion. The control portion measures the temperature rise time until the temperature of the fluid contact portion reaches an upper limit set temperature when heating the fluid contact portion and the temperature drop time until the temperature of the fluid contact portion reaches a lower limit set temperature when stopping heating the fluid contact portion, and based on the temperature rise time and the temperature drop time, converts a determined flow velocity into a flow rate value so as to perform flow rate determination.

6 Claims, 12 Drawing Sheets

(56) References Cited

FOREIGN PATENT DOCUMENTS

| | | | | |
|---|---|---|---|---|
| CN | 114705262 A | 7/2022 | | |
| CN | 115711652 A | 2/2023 | | |
| DE | 102004048901 A1 | 4/2006 | | |
| DE | 102015114139 B3 * | 12/2016 | ............... | G01F 1/68 |
| EP | 1310775 A1 | 5/2003 | | |
| JP | S61-186820 A | 8/1986 | | |
| JP | H01-301119 A | 12/1989 | | |
| JP | 2001-091370 A | 4/2001 | | |
| JP | 2002-039872 A | 2/2002 | | |
| JP | 2002-214015 A | 7/2002 | | |
| JP | 2008-014729 A | 1/2008 | | |
| JP | 2010-054251 A | 3/2010 | | |
| JP | 2010-164479 A | 7/2010 | | |

* cited by examiner

THERMAL TYPE FLOWMETER

CROSS-REFERENCE TO RELATED APPLICATIONS

This application claims the priority of Japanese Patent Application No. 2024-043177 filed on Mar. 19, 2024, in the Japanese Patent Office, the disclosure of which is incorporated herein by reference.

TECHNICAL FIELD

The present disclosure relates to a thermal type flowmeter for measuring the flow rate of a fluid based on the temperature rise time and the temperature drop time of the fluid contact portion.

BACKGROUND

In the past, flowmeters used to detect fluid's temperature flow rate determination were known to include flowmeters as described in following patent document 1. This flowmeter includes a heat source provided in the flow path, and a temperature detection element provided downstream of the heat source. The determination method for flow rate is to generate heat from the heat source, use temperature detection element to detect the temperature of the fluid in the flow path, and determine the flow rate of the fluid by the time difference from the heat driving moment of the heat source to the moment when the detection temperature reaches its maximum value.

PRIOR ART DOCUMENT

Patent Document

Patent Document 1: Japanese Patent Application No. 2002-214015

SUMMARY

Technical Problem

However, in accordance with the previous flowmeters, there are the following problems: in the case of low flow rate fluid with low flow velocity, the time until the fluid heated by the heat source reaches a downstream temperature detection element becomes longer, and an amount of heat release from the fluid increases, making it difficult to detect the moment when the detection temperature reaches its maximum value.

In view of such issue, the present disclosure aims to provide a thermal type flowmeter that can accurately perform flow rate determination at high speed and high precision even with low flow rate.

Technical Solution

In order to solve the problem, the thermal type flowmeter of the present disclosure is characterized in that it includes: a sensor portion that conducting heating and temperature detection of a fluid contact portion in contact with a fluid flowing in the flow path; and a control portion controlling heating and temperature detection carried out by the sensor portion; wherein the control portion measures the temperature rise time until the temperature of the fluid contact portion reaches an upper limit set temperature when heating the fluid contact portion and the temperature drop time until the temperature of the fluid contact portion reaches a lower limit set temperature when stopping heating the fluid contact portion, and calculates a time ratio based on the temperature rise time and the temperature drop time, and based on the calculated time ratio, converts a determined flow velocity into a flow rate value so as to perform flow rate determination. It should be noted that the fluid contact portion refers to a liquid contact portion in contact with the liquid when the fluid is liquid, and a gas contact portion in contact with the gas when the fluid is gas.

In addition, the thermal type flowmeter of the present disclosure is characterized in that it includes: a sensor portion that conducting heating and temperature detection of a fluid contact portion in contact with a fluid flowing in the flow path; and a control portion controlling heating and temperature detection carried out by the sensor portion; wherein the control portion measures the temperature rise time until the temperature of the fluid contact portion reaches an upper limit set temperature when heating the fluid contact portion and the temperature drop time until the temperature of the fluid contact portion reaches a lower limit set temperature when stopping heating the fluid contact portion, and calculates the difference between the temperature rise time and the temperature drop time, and based on the calculated difference, converts a determined flow velocity into a flow rate value so as to perform flow rate determination.

In addition, the characteristic of the present disclosure is that in a thermal type flowmeter including the structure, the sensor portion includes: a heat conductive pipe provided in the flow path; a temperature measuring resistor body configured inside the heat conductive pipe and conducting heating and temperature detection of the fluid contact portion; a transformer applying a pulse current inversely proportional to the resistance value of the temperature measuring resistor body; and a reference resistance generating a pulse voltage inversely proportional to the resistance value of the temperature measuring resistor body through the pulse current flowing through the transformer.

In addition, the characteristic of the present disclosure is that in a thermal type flowmeter including the structure, the control portion supplies the sensor portion with a superimposed current obtained by adding a detection pulse current for temperature detection to an applied current for heating.

In addition, the characteristic of the present disclosure is that in a thermal type flowmeter including the structure, the control portion stops heating the fluid contact portion at the time when the temperature of the fluid contact portion reaches a temperature rise set level, and starts heating the fluid contact portion at the time when the temperature of the fluid contact portion reaches a temperature drop set level.

Technical Effect

In accordance with the thermal type flowmeter of the present disclosure, it has the effect of accurately performing flow rate determination at high speed and high precision even at low flow rate by adopting the structure.

DETAILED DESCRIPTION

Hereafter, embodiments of the present disclosure will be described below in detail with reference to accompanying drawings.

Figure 1:
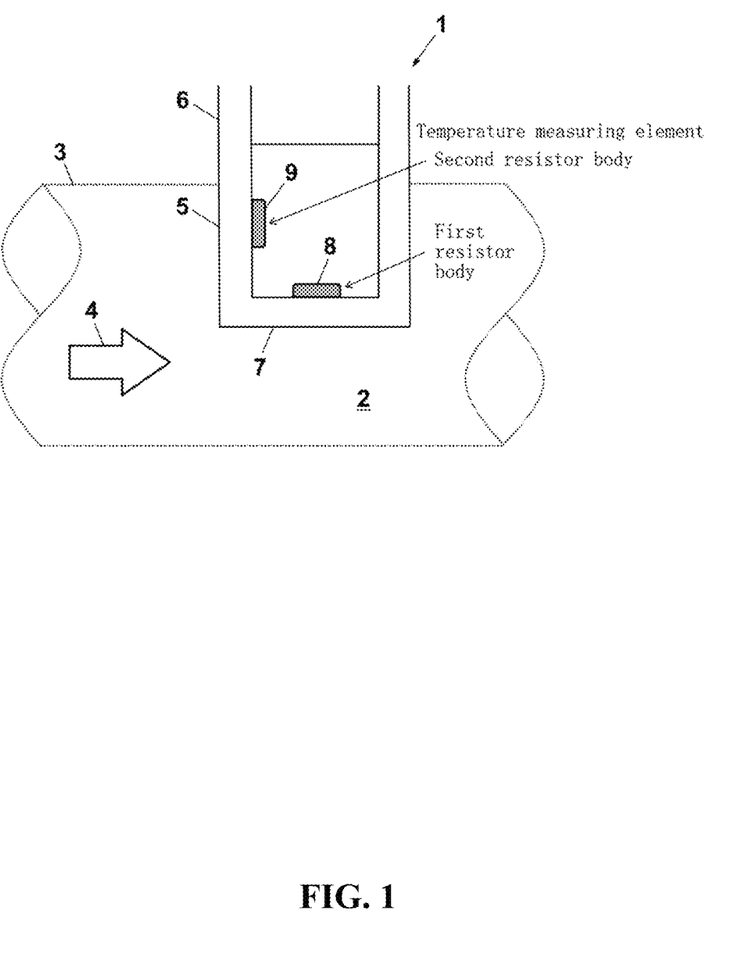
FIG. 1 is an overall diagram illustrating the structure of a thermal type flowmeter in accordance with an embodiment of the present disclosure.

As shown in the overall diagram of FIG. 1, a thermal type flowmeter 1 of this embodiment is installed in a detachable manner at a piping 3 that constitutes a flow path 2, and determines the flow rate of fluid 4 flowing in the flow path 2 based on the time until set temperature is reached. The thermal type flowmeter 1 is composed of a sensor portion 5 provided inside the piping 3 and a main body portion 6 integrated with the sensor portion 5 and provided outside the piping 3.

In a hollow heat conductive pipe (an SUS pipe in this embodiment) 7, two temperature measuring resistor bodies (a first resistor body 8 and a second resistor body 9) are provided inside the sensor portion 5 as temperature measuring elements. The temperature measuring resistor body is a sensor that measures temperature by detecting the resistance value changing with temperature, which is composed of metals with good temperature characteristics and small temporal changes such as platinum, nickel, and copper. The first resistor body 8 performs two tasks of heating and temperature detection of the fluid contact portion in contact with the fluid 4, and is provided on an inner bottom surface of the heat conductive pipe 7. The second resistor body 9 only conducts temperature detection of the fluid contact portion, and is provided on the inner side surface far from the inner bottom surface of the heat conductive pipe 7 as a position that is not affected by the heating of the first resistor body 8.

In addition to a control portion 10 (referring to FIG. 2) for controlling the heating and temperature detection of the temperature measuring resistor body, the main body portion 6 also has a display portion for displaying determination results of the flow rate (not shown), and an operation portion for user to input operations (not shown), and the like.

Figure 2:
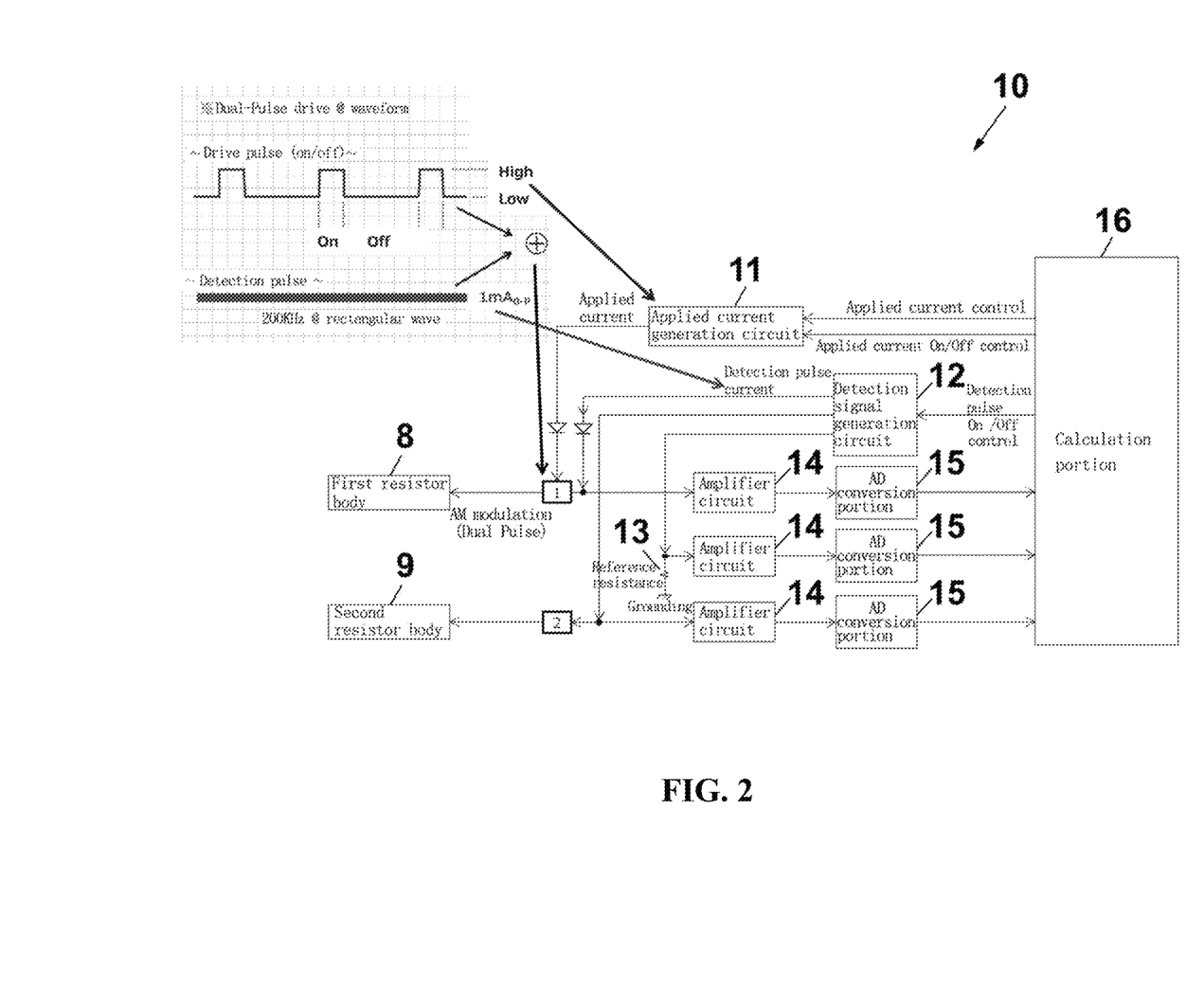
FIG. 2 is a block diagram illustrating the structure of a control portion of the flowmeter.

As shown in the block diagram of FIG. 2, the control portion 10 is composed of an applied current generation circuit 11, a detection signal generation circuit 12, a reference resistance 13, amplifier circuits 14, 14, . . . , AD (Analog Digital) conversion portions 15, 15, . . . , an calculation portion 16, and the like.

The applied current generation circuit 11 is a circuit that is connected to the calculation portion 16 and the first resistor body 8, and generates an applied current for heating the first resistor body 8 based on an applied current control signal output from the calculation portion 16. The applied current generation circuit 11 supplies an applied current for heating to the first resistor body 8 if it receives an applied current conduction control signal from the calculation portion 16 when heating, and stops supplying the applied current for heating to the first resistor body 8 if receives an applied current shutdown control signal from the calculation portion 16 when the heating is stopped.

The detection signal generation circuit 12 is a circuit that is connected to the calculation portion 16, the first resistor body 8, and the second resistor body 9, and generates a detection signal for temperature detection of the first resistor body 8 and the second resistor body 9. The detection signal generation circuit 12 supplies detection pulse current for temperature detection to the first resistor body 8 and the second resistor body 9 if it receives a detection pulse conduction control signal from the calculation portion 16 when temperature detection, it supplies detection pulse current for temperature detection to the first resistor body 8 and the second resistor body 9, and stops the supplying detection pulse current for temperature detection to the first resistor body 8 and the second resistor body 9 if it receives a detection pulse shutdown control signal from the calculation portion 16 when the temperature detection is stopped.

The reference resistance 13 is connected between the input side of the amplifier circuit 14 and grounding, so that the inversion of the applied detection pulse current is supplied to the amplifier circuit 14.

The amplifier circuits 14 are connected to the first resistor body 8 and the second resistor body 9, and convert the resistance value corresponding to the determined temperature output from the first resistor body 8 and the second resistor body 9 into voltage. The converted voltage is amplified by the operational amplifier of the amplifier circuit 14 and output to the AD conversion portion 15.

The AD conversion portion 15 converts analog data of the voltage output from the amplifier circuit 14 into digital data and outputs it to the calculation portion 16.

The calculation portion 16 is composed of a MCU (Micro Control Unit), which performs various calculations based on the digital data representing the determined temperatures of the first resistor body 8 and the second resistor body 9. The calculation portion 16 has a timer that measures the temperature rise time [ms] until an upper limit set temperature is reached and temperature drop time [ms] until a lower limit set temperature is reached by multiplying the count and the clock cycle. In addition, the calculation portion 16 determines the flow velocity [m/s] based on the measured temperature rise time [ms] and temperature drop time [ms], and calculates the flow rate value [L/min] based on the flow velocity [m/s] and the piping diameter [mm].

In this embodiment, the first resistor body 8 is driven by a superimposed current (Dual-Pulse current) obtained by adding the detection pulse current to the applied current. Therefore, by adding the detection pulse current for temperature detection to the applied current for heating, the temperature detection of the fluid contact portion can always be carried out with the same accuracy even without heating the first resistor body 8.

Next, in the thermal type flowmeter 1 of this embodiment, a summary of the conversion method for flow rate will be described.

Figure 3:
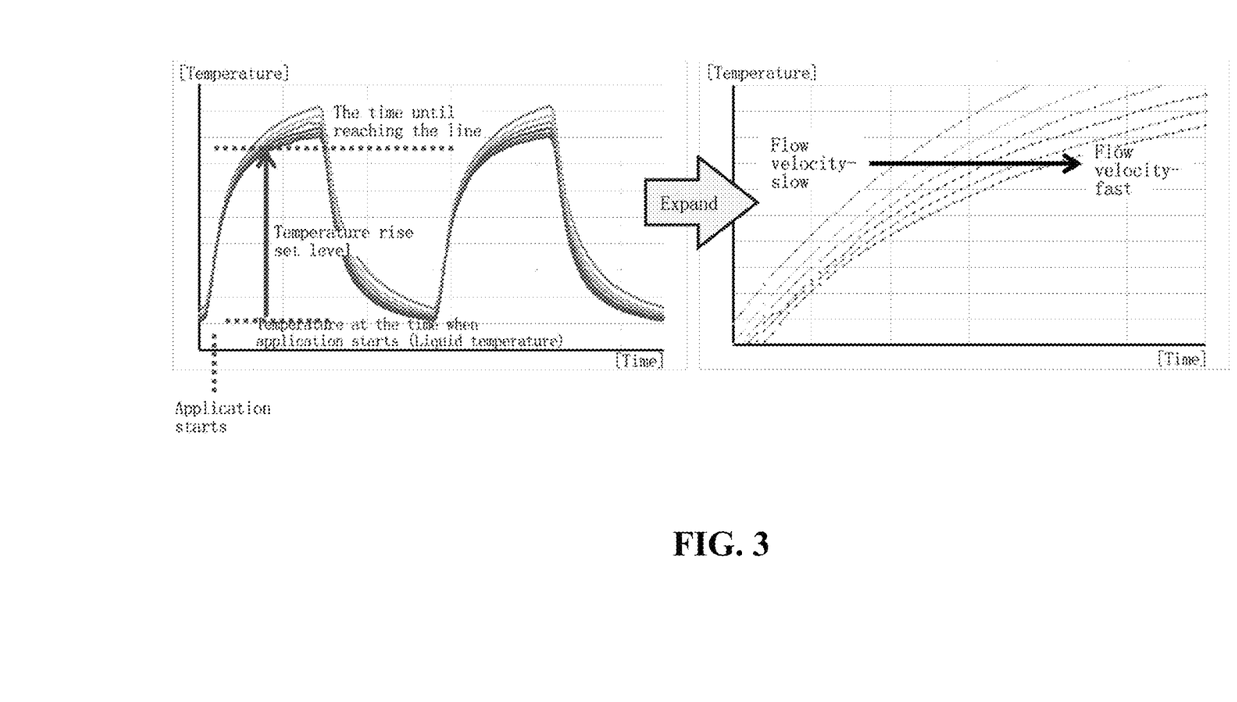
FIG. 3 is a chart illustrating the relationship between the output voltage and the time of a first resistor body of the flowmeter when heating (when an upper limit set temperature is reached).
Figure 4:
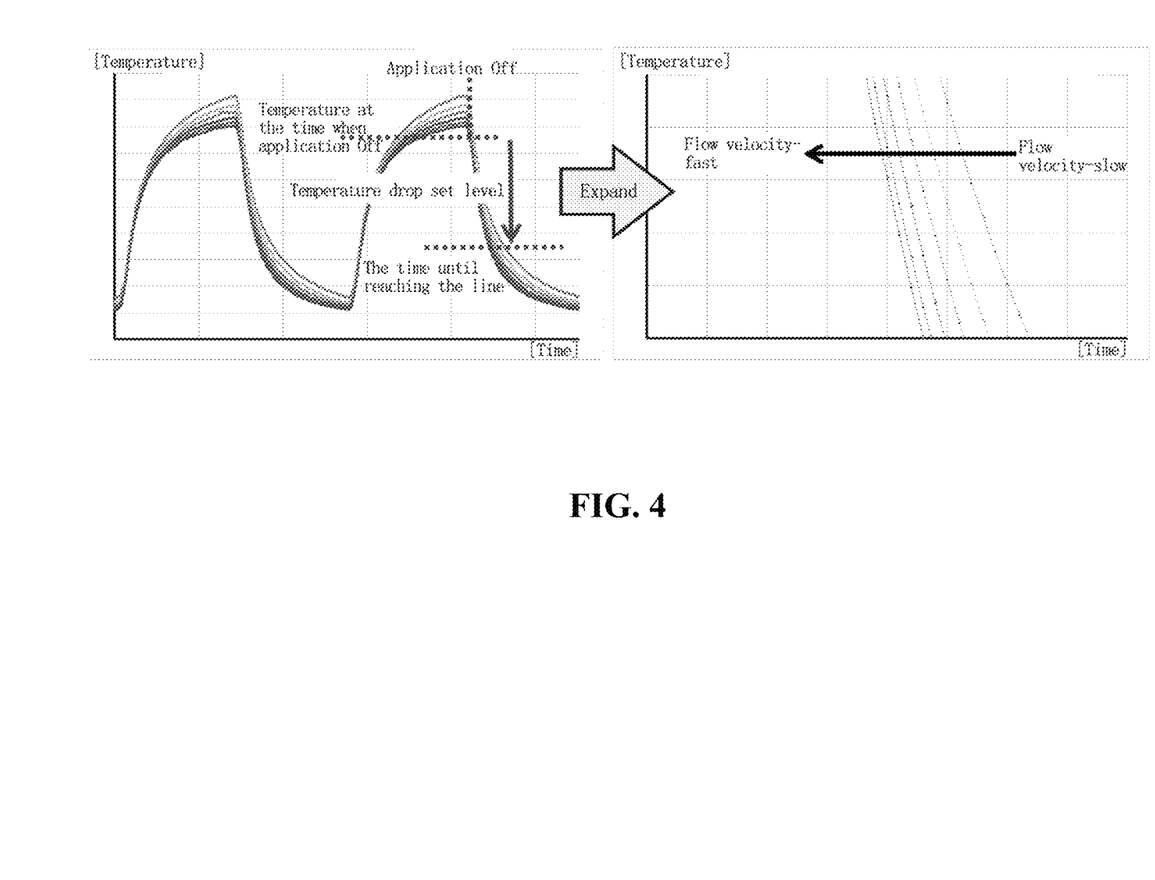
FIG. 4 is a chart illustrating the relationship between the output voltage and the time of the first resistor body of the flowmeter when the heating is stopped (when a lower set temperature is reached).

The relationship between the output voltage (temperature) and time is shown in FIG. 3 and FIG. 4 when the superimposed current (Dual-Pulse current) obtained by adding the detection pulse current to the applied current is applied to the first resistor body 8. FIG. 3 shows a comparison of the time when the applied current is supplied to the first resistor body 8 (when heating) it takes for the temperature of the fluid contact portion to gradually rise from the temperature when application starts (liquid temperature) to the upper limit set temperature, for each flow rate. As can be clearly seen from this figure, if the flow rate is low, the temperature rise time until the upper limit set temperature is reached is short. As the flow rate increases, heat is lost by the fluid. Therefore, it is known that the temperature rise time until the upper limit set temperature is reached becomes longer. The calculation portion 16 is used to convert the temperature rise time into a flow rate value.

On the other hand, FIG. 4 shows a comparison of the time when the applied current is stopped being supplied to the first resistor body 8 (when the heating is stopped) it takes for the temperature of the fluid contact portion to gradually drop from the temperature when the application is stopped to the lower limit set temperature, for each flow rate. As can be clearly seen from the figure, if the flow rate is low, the temperature drop time until the lower limit set temperature is reached is long. As the flow rate increases, heat is lost by the fluid. Therefore, it is known that the temperature drop time until the lower limit set temperature is reached becomes shorter. The calculation portion 16 is used to convert the temperature drop time into a flow rate value.

Next, in the thermal type flowmeter 1 of this embodiment, the way of thinking the flow rate conversion based on method of the time ratio will be described.

Figure 5:
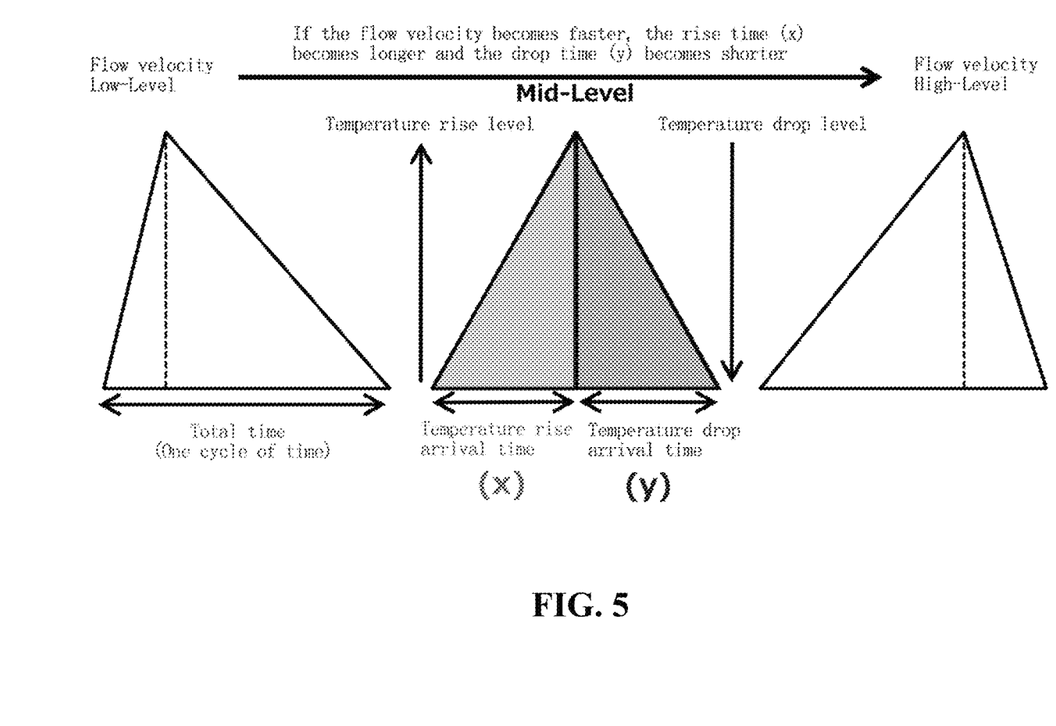
FIG. 5 is a schematic diagram illustrating the concept for the method of the time ratio.

As shown in FIG. 5, for a temperature rise level (t), the temperature rise time (x) until its upper set temperature is reached and the temperature drop time (y) until the lower set temperature is dropped to vary depending on the flow rate. Therefore, in order to utilize the time difference and convert the flow velocity into the flow rate value, respective ratio of time, which is the time ratio, is calculated in the following way.

Time ratio $(z)$ = Temperature rise time $(x)$/Temperature drop time $(y)$

Figure 6:
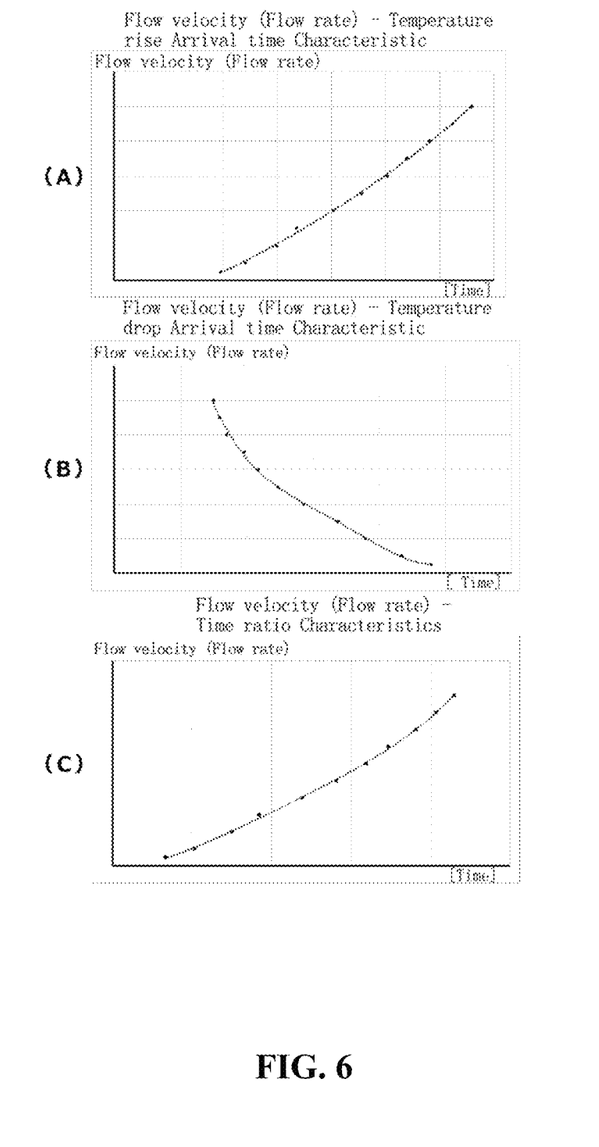
FIG. 6 is a chart illustrating the characteristics of (A) the temperature rise time, (B) the temperature drop time, and (C) the time ratio of the flowmeter.

FIG. 6 is a graphical representation of the temperature rise time (x), temperature drop time (y), and time ratio (z). The vertical axis of the chart is set as flow rate [L/min] and the horizontal axis is set as temperature rise time [ms] in (A) of the chart, the horizontal axis is set as temperature drop time [ms] in (B) of the chart, and the horizontal axis is set as a function of time ratio in (C) of the chart. As can be clearly seen from the figure, in an observation of approximate curves, characteristic differences are presented based on the flow velocity and the flow rate. Therefore, in the thermal type flowmeter 1 of this embodiment, the temperature rise time (x), temperature drop time (y), and time ratio (z) is calculated to convert the flow velocity into the flow rate value.

Next, in the thermal type flowmeter 1 of this embodiment, the flow rate determination process will be described.

<Initial Condition Confirmation>

Figure 7:
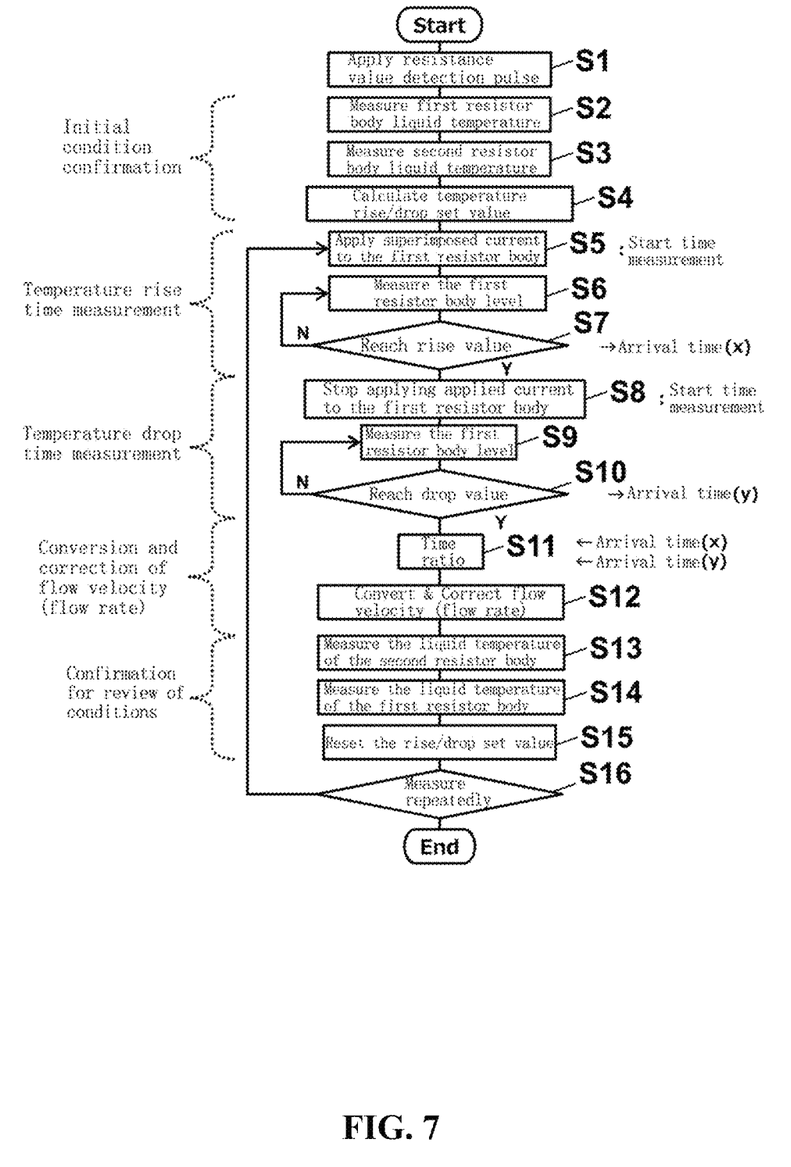
FIG. 7 is a flowchart illustrating the flow rate determination process of the flowmeter.

As shown in the flowchart of FIG. 7, in the calculation portion 16, a detection pulse conduction control signal is output to the detection signal generation circuit 12. Then, the detection signal generation circuit 12 applies a detection pulse current (1 mA/100 KHz) for resistance value detection to the first resistor body 8 and the second resistor body 9 (step 1). In addition, the inversion of the detection pulse current applied to the first resistor body 8 and the second resistor body 9 is applied to the reference resistance 13. Next, in the calculation portion 16, the difference in amplitude between the first resistor body 8 and the reference resistance 13 is measured and converted into temperature (step 2). In addition, for the second resistor body 9, the measurement is also carried out similarly to the first resistor body 8 and converted into temperature (step 3). Next, in the calculation portion 16, a reaching level value for temperature to rise and a reaching level value for temperature to drop are calculated based on the voltage of the second resistor body 9 (step 4).

<Temperature Rise Time Measurement>

In the calculation portion 16, an applied current control signal and an applied current conduction control signal are output to the applied current generation circuit 11, and a detection pulse conduction control signal is output to the detection signal generation circuit 12. Then, a superimposed current (Dual-Pulse current) obtained by adding a detection pulse current to the applied current is applied to the first resistor body 8 (step 5). Starting from this point of time, time measurement is carried out with a timer, and the time passing is counted. Next, in the calculation portion 16, the level of the first resistor body 8 is measured (step 6). Here, in the calculation portion 16, it is judged whether the level of the first resistor body 8 has reached a rise value (step 7). If the rise value is reached, the temperature rise time (x) is measured based on the time elapsed from the start of heating (yes in step 7). If the rise value is not reached, the level of the first resistor body 8 is continued to be measured until the rise value is reached (no in step 7).

<Measurement of Temperature Drop Time Measurement>

In the calculation portion 16, an applied current shutdown control signal is output to the applied current generation circuit 11. Then, the applied current applied by the applied current generation circuit 11 to the first resistor body 8 is stopped being supplied (step 8). Starting from this point of time, time measurement is carried out with timer, and the time passing is counted. Next, in the calculation portion 16, the level of the first resistor body 8 is measured (step 9). Here, in the calculation portion 16, it is judged whether the level of the first resistor body 8 has reached a drop value (step 10). If the drop value is reached, the temperature drop time (y) is measured based on the time elapsed since the heating is stopped (yes in step 10). If the drop value is not reached, the level of the first resistor body 8 is continued to be measured until the drop value is reached (no in step 10).

<Conversion and Correction of Flow Velocity (Flow Rate)>

In the calculation portion 16, the time ratio (z) is calculated based on the measured temperature rise time (x) and temperature drop time (y) (step 11). Then, based on the calculated time ratio (z), the determined flow velocity is converted into a flow rate value and corrected (step 12).

<Confirmation for Review of Conditions>

The same process is performed as the <initial condition confirmation>, and in the calculation portion 16, the temperature (liquid temperature) of the second resistor body 9 is measured (step 13). In addition, for the first resistor body 8, the temperature (liquid temperature) is measured in the same way (step 14). Next, in the calculation portion 16, the reaching level value for temperature to rise and the reaching level value for temperature to drop are calculated based on the voltage of the second resistor body 9, and the set value is reviewed (step 15). Then, repeated measurements in the order of <temperature rise time measurement> <temperature drop time measurement> <Conversion and correction of flow velocity (flow rate)> is carried out (step 16).

Next, in the thermal type flowmeter 1 of this embodiment, the data processing of the flow rate conversion performed by the calculation portion 16 will be described.

Figure 8:
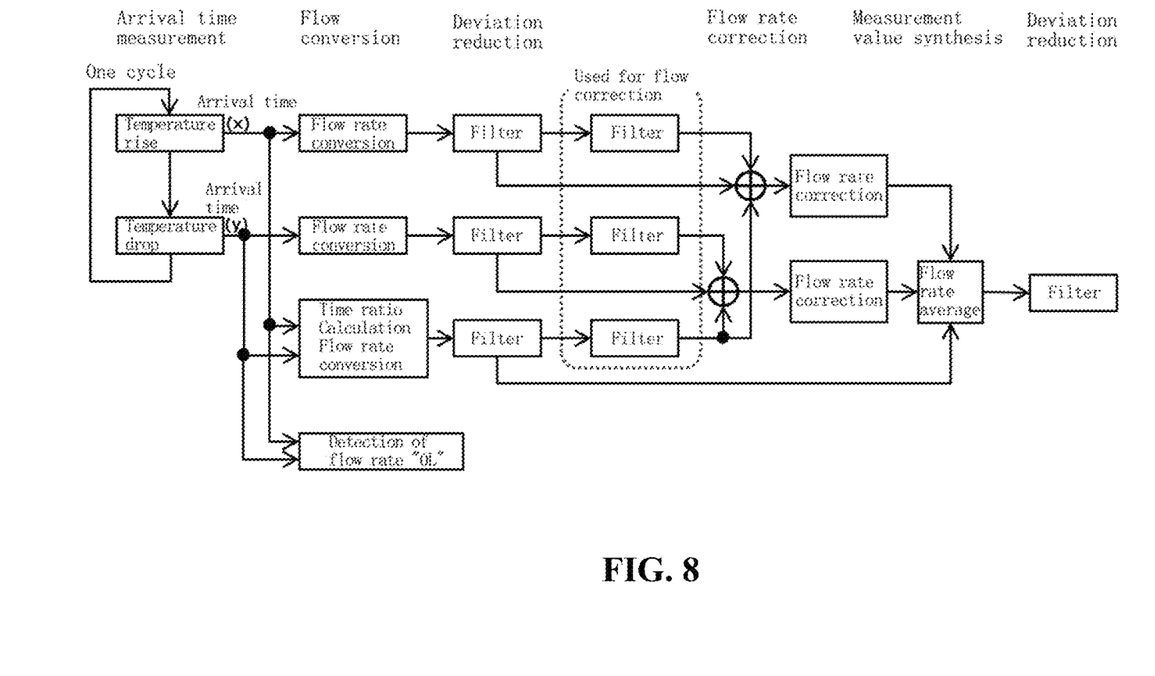
FIG. 8 is a flowchart illustrating data processing of the flow rate conversion of the flowmeter.

As shown in the flowchart of FIG. 8, in the calculation portion 16, as a cycle, arrival time of the temperature rise time (x) and the temperature drop time (y) are measured at 2 Hz or more (in 0.5 seconds or less). In addition, respective flow rate conversion is carried out in accordance with the arrival time, and the calculation of the time ratio (z) and detection of flow 0L is performed. The time ratio (z) is directly used for the detection, so that the influence of the digital filter (delay) is avoided.

Then, in the calculation portion 16, noise is removed from the input signal through the digital filter for deviation reduction. After the deviation is reduced, flow rate correction is performed through the digital filter, and the measured values are synthesized to average respective flow rates. Finally, the averaged flow rate is noise removed through the digital filter, deviation reduced, and set as the flow rate value.

Figure 9:
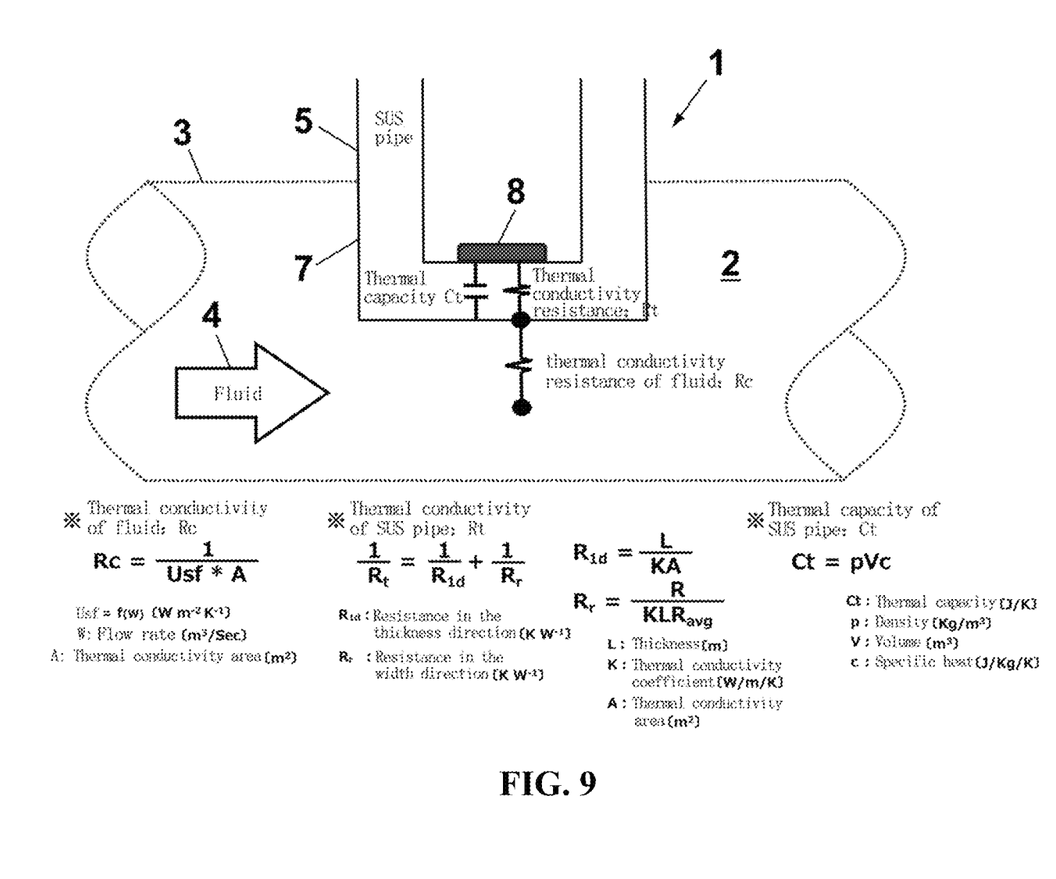
FIG. 9 is a block diagram illustrating the structure of an equivalent circuit structure for a sensor portion of the flowmeter.

FIG. 9 is a diagram illustrating the structure of an equivalent circuit of the sensor portion 5 in the thermal type flowmeter 1 of this embodiment. As shown in FIG. 9, when observed from the first resistor body 8, the equivalent circuit of the sensor portion 5 is represented by a thermal resistance (Rt) of the heat conductive pipe 7 (SUS pipe) that transfers heat, a thermal capacity (Ct) of the heat conductive pipe 7 (SUS pipe) that stores heat, and the thermal conductivity resistance (Rc) of the fluid 4 that transfers heat to the fluid 4. Therefore, by changing the flow velocity of fluid 4, the thermal conductivity resistance (Rc) of the fluid 4 is changed, and the heating and heat releasing characteristics of the first resistor body 8 are changed.

Figure 10:
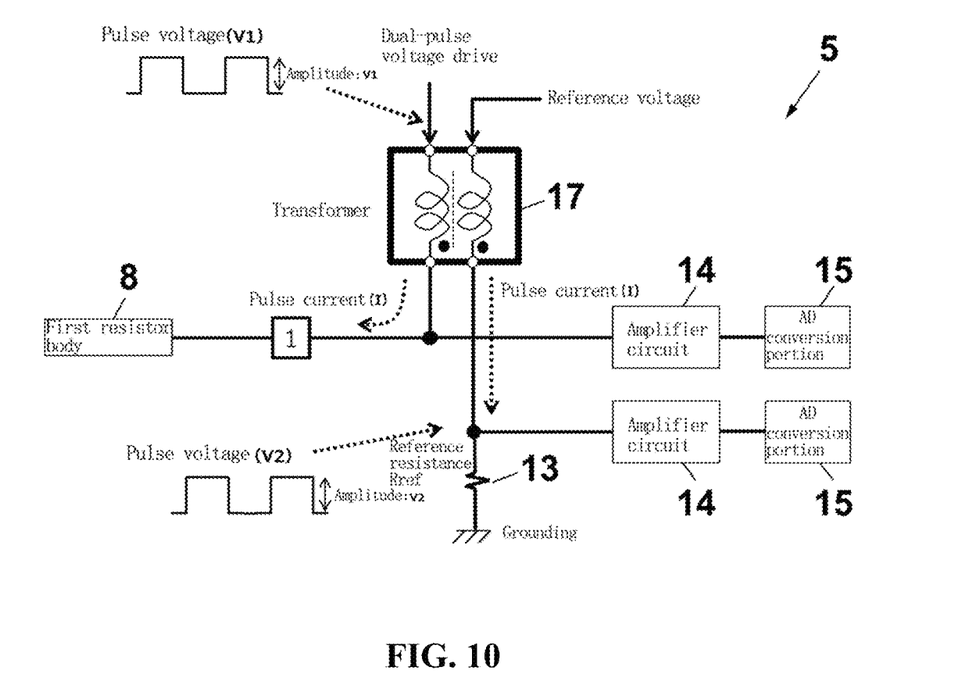
FIG. 10 is a block diagram illustrating an example of the flowmeter with a transformer in the sensor portion.

FIG. 10 is a diagram illustrating an example of the thermal type flowmeter 1 with a transformer in the sensor portion 5 of this embodiment. As shown in FIG. 10, if a pulse voltage (V1) for detecting resistance value is applied to the sensor portion 5, a pulse current (I) inversely proportional to the resistance value of the first resistor body 8 flows through the transformer 17. Through the magnetic field generated by the current flowing through the transformer (inductor) 17, the same pulse current (I) flows through the inductor on the opposite side. The pulse current (I) flows through a reference resistance (Rref) 13, generating a pulse voltage (V2) inversely proportional to the resistance value of the first resistor body 8. By inputting this pulse voltage (V2) into an amplifier circuit 14, the resistance value of the first resistor body 8 can be accurately detected regardless of the conduction/shutdown of the applied voltage for heating.

Finally, the optimization of the set temperature when measurement in the thermal type flowmeter 1 of this embodiment will be described.

Figure 11:
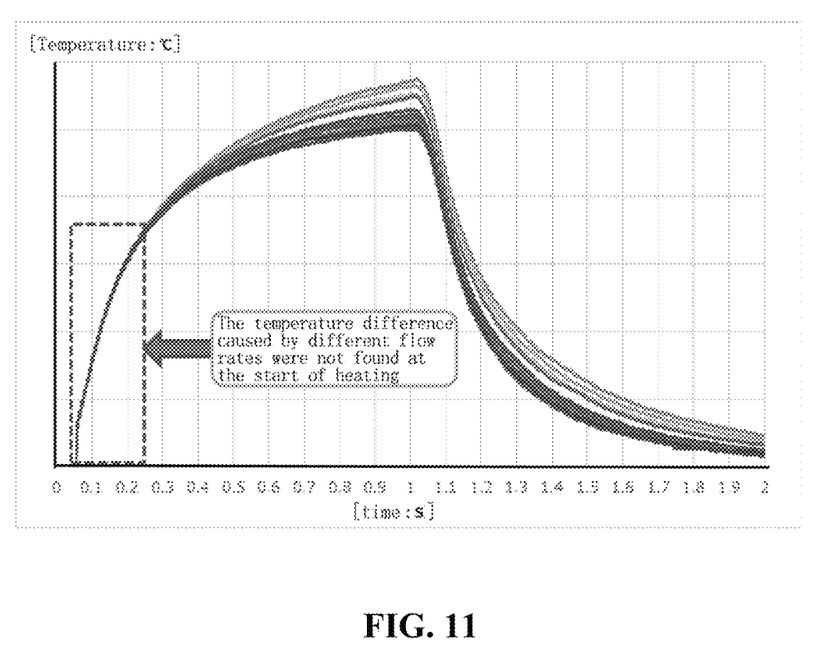
FIG. 11 is a chart illustrating the relationship between the time and temperature of the flowmeter corresponding to the flow velocity and the flow rate at the start of heating.
Figure 12:
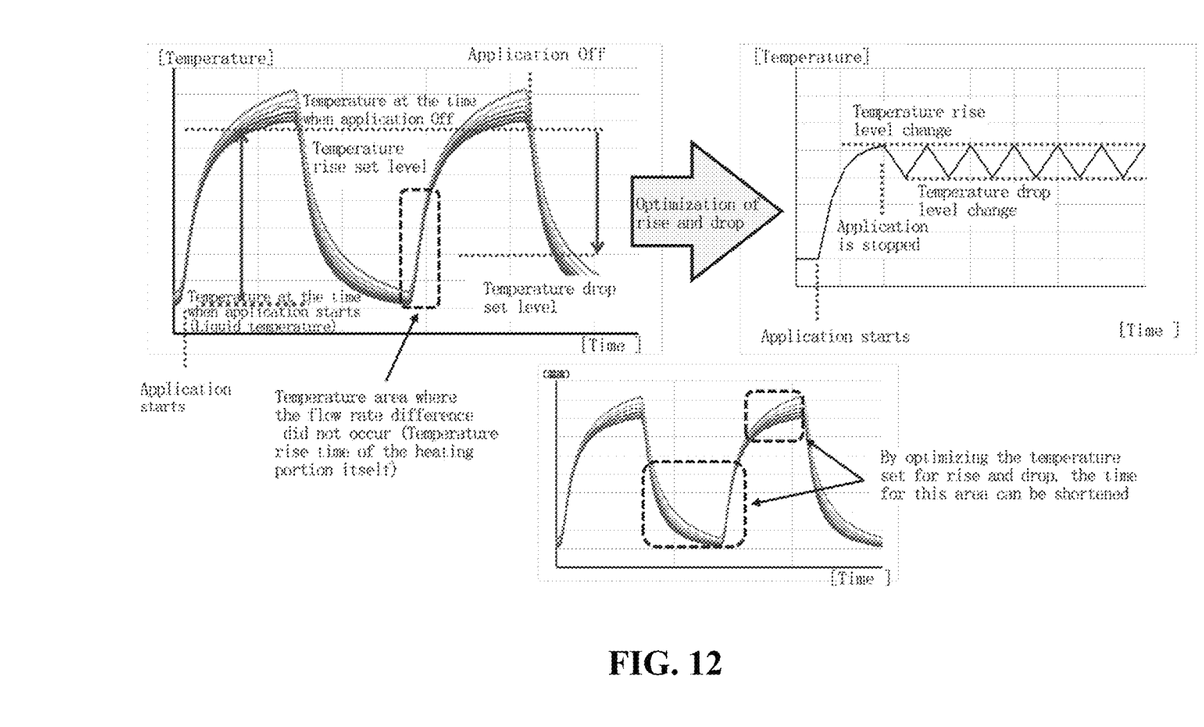
FIG. 12 is a chart illustrating the optimization of set levels for temperature to rise and for temperature to drop of the flowmeter.

For the thermal type flowmeter 1 of this embodiment, FIG. 11 shows the relationship between time and temperature corresponding to the flow velocity and the flow rate at the start of heating, and FIG. 12 shows the optimization of the set levels for temperature to rise and for temperature to drop. As shown in FIG. 11, the initial time at the start of heating (surrounded by the dashed line in the figure) is the temperature rise time of the fluid contact portion in contact with the fluid and the response time of the temperature measuring resistor body (the first resistor body 8), and no temperature difference caused by different flow velocities and flow rates was found. For example, in the case of a response time of approximately 0.2 [s] for platinum temperature measuring resistor body Pt100 (new JIS), due to in the time of 0.2 [s]+α, there is no the temperature difference caused by different flow velocities and flow rates, from the perspective of responsiveness and accuracy improvement, temperature area with no the flow rate difference is not used for measurement.

Therefore, as shown in FIG. 12, the set levels for temperature to rise and for temperature to drop are optimized, and the heating time independent of the flow velocity and the flow rate is reduced when measurement. That is, the control portion 10 repeatedly controls the current of the temperature measuring resistor body for heating by applying shutdown (stopping heating) at the point of time when the temperature of the fluid contact portion reaches the temperature rise set level. The control portion 10 repeatedly controls the current of the temperature measuring resistor body for heating by applying conduction (starting heating) at the point of time when the temperature of the fluid contact portion reaches the temperature drop set level. In this way, by repeatedly applying conduction and shutdown to the current when the set level is reached, it is possible to shorten the measurement time and improve the responsiveness of the flow determination. In addition, increasing the number of measurement can also improve the accuracy of flow rate measurement.

As explained above, according to the thermal type flowmeter 1 of this embodiment, the superimposed current (Dual-Pulse current) obtained by adding the detection pulse current to the applied current is applied to the temperature measuring resistor body, the temperature rise time (x) and temperature drop time (y) are measured to calculate the time ratio (z), and based on the calculated time ratio (z), the determined flow velocity is converted into flow rate, so that accurate flow rate measurement can be carried out at high speed and high precision even at low flow rate. In addition, by using a so-called triangulation method that detects temperature rise in a three-point manner as 1) heating start point, 2) temperature rise point, and 3) temperature drop point, it is possible to make the detection of flow rate 0L easier and improve the linearity of temperature rise time and flow rate conversion, enabling more accurate flow rate measurement.

It should be noted that in the above embodiments, the temperature rise time (x) and temperature drop time (y) are measured to calculate the time ratio (z), and the calculated time ratio (z) is converted into a flow rate value to determine the flow rate. However, it can also be replaced by calculating the difference (A) between the temperature rise time (x) and the temperature drop time (y), and converting the calculated difference (A) into a flow rate value to determine the flow rate.

SYMBOL DESCRIPTION

1: Thermal type flowmeter
2: Flow path
3: Piping
4: Fluid
5: Sensor portion
6: Main body portion
7: Heat conductive pipe
8: First resistor body
9: Second resistor body
10: Control portion 11: Applied current generation circuit
12: Detection signal generation circuit
13: Reference resistance
14: Amplifier circuit
15: AD conversion portion
16: Calculation portion
17: Transformer

What is claimed is:

1. A thermal type flowmeter, comprising:
a sensor portion conducting heating and temperature detection of a fluid contact portion in contact with a fluid flowing in a flow path; and
a control portion controlling the heating and temperature detection conducted by the sensor portion,
wherein the control portion measures a temperature rise time until a temperature of the fluid contact portion reaches an upper limit set temperature when heating the fluid contact portion and a temperature drop time until the temperature of the fluid contact portion reaches a lower limit set temperature when stopping heating the fluid contact portion, and calculates a time ratio based on the temperature rise time and the temperature drop time, and based on the calculated time ratio, converts a determined flow velocity into a flow rate value so as to perform flow rate determination via a sequence of flow rate conversion, and deviation reduction,
wherein the control portion supplies the sensor portion with a superimposed current obtained by superimposing a detection pulse current for temperature detection supplied when heating and an applied current for heating that is continuously supplied, within the same cycle without switching.

2. The thermal type flowmeter of claim 1, wherein the sensor portion comprises:
a heat conductive pipe provided in the flow path;
a first temperature measuring resistor body configured to a first location in the inner surface of the heat conductive pipe and conducting the heating and temperature detection of the fluid contact portion;
a second temperature measuring resistor body configured on a second location on the inner surface of the heat conductive pipe and conducting the temperature detection only, wherein the second location is far from the first location so that the second temperature measuring resistor is not affected by the heating of the first temperature measuring resistor body,
a transformer applying a pulse current inversely proportional to a resistance value of the first temperature measuring resistor body and the second temperature measuring resistor body; and
a reference resistance generating a pulse voltage inversely proportional to the resistance value of the first temperature measuring resistor body and the second temperature measuring resistor body through the pulse current flowing through the transformer.

3. The thermal type flowmeter of claim 1, wherein the control portion stops heating the fluid contact portion when the temperature of the fluid contact portion reaches a temperature rise set level, and starts heating the fluid contact portion when the temperature of the fluid contact portion reaches a temperature drop set level.

4. A thermal type flowmeter, comprising:
a sensor portion conducting heating and temperature detection of a fluid contact portion in contact with a fluid flowing in a flow path; and
a control portion controlling the heating and temperature detection conducted by the sensor portion,
wherein the control portion measures a temperature rise time until a temperature of the fluid contact portion reaches an upper limit set temperature when heating the fluid contact portion and a temperature drop time until the temperature of the fluid contact portion reaches a lower limit set temperature when stopping heating the fluid contact portion, and calculates a difference between the temperature rise time and the temperature drop time, and based on the calculated difference, converts a determined flow velocity into a flow rate value so as to perform flow rate determination via a sequence of flow rate conversion, and device reduction, and
wherein the control portion supplies the sensor portion with a superimposed current obtained by superimposing a detection pulse current for temperature detection supplied when heating and an applied current for heating that is continuously supplied, within the same cycle without switching.

5. The thermal type flowmeter of claim 4, wherein the sensor portion comprises:
a heat conductive pipe provided in the flow path;
a first temperature measuring resistor body configured to a first location on the inner surface of the heat conductive pipe and conducting the heating and temperature detection of the fluid contact portion;
a second temperature measuring resistor body configured on a second location on the inner surface of the heat conductive pipe and conducting the temperature detection only, wherein the second location is far from the first location so that the second temperature measuring resistor is not affected by the heating of the first temperature measuring resistor body;
a transformer applying a pulse current inversely proportional to a resistance value of the first temperature measuring resistor body and the second temperature measuring resistor body; and
a reference resistance generating a pulse voltage inversely proportional to the resistance value of the first temperature measuring resistor body and the second temperature measuring resistor body through the pulse current flowing through the transformer.

6. The thermal type flowmeter of claim 5, wherein the control portion stops heating the fluid contact portion when the temperature of the fluid contact portion reaches a temperature rise set level, and starts heating the fluid contact portion when the temperature of the fluid contact portion reaches a temperature drop set level.

* * * * *